United States Patent
Lee et al.

(10) Patent No.: US 7,450,839 B2
(45) Date of Patent: Nov. 11, 2008

(54) PHOTOGRAPHING DEVICE AND METHOD FOR PANORAMIC IMAGING

(75) Inventors: Woo-jong Lee, Suwon-si (KR); Sang-on Choi, Suwon-si (KR); Woo-jong Cho, Suwon-si (KR); Jong-hwa Won, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 367 days.

(21) Appl. No.: 11/207,723

(22) Filed: Aug. 22, 2005

(65) Prior Publication Data
US 2006/0039693 A1  Feb. 23, 2006

(30) Foreign Application Priority Data
Aug. 20, 2004  (KR) .................. 10-2004-0065917

(51) Int. Cl.
G03B 41/00 (2006.01)
G03B 13/02 (2006.01)
H04N 5/228 (2006.01)

(52) U.S. Cl. .................. 396/322; 396/374; 348/208.1

(58) Field of Classification Search .................. 396/322, 396/329, 335, 336, 338, 374; 348/208.1, 348/208.2, 208.3, 208.4, 208.5, 208.15
See application file for complete search history.

(56) References Cited

U.S. PATENT DOCUMENTS 7,194,816 B2 * 3/2007 Tamura .................. 33/355 R
2004/0125044 A1 * 7/2004 Suzuki .................. 345/1.1
2005/0212909 A1 * 9/2005 Takehara et al. .............. 348/36

FOREIGN PATENT DOCUMENTS

| JP | 07-306486 A | 11/1995 |
| JP | 2000-032379 A | 1/2000 |
| JP | 2000299804 A | 10/2000 |
| JP | 2004-93562 A | 3/2004 |
| KR | 10-2005-0011348 A | 1/2005 |

* cited by examiner

*Primary Examiner*—Rodney E Fuller
(74) *Attorney, Agent, or Firm*—Sughrue Mion, PLLC (57) ABSTRACT

A photographing device supporting a panoramic imaging includes an image capture section for photographing a subject and outputting image data representing the subject, a sensor module for computing and outputting an azimuth of a photographing direction toward the subject, an image processor for creating a panoramic image by combining a plurality of image data captured at the image capture section, an output section for displaying a message using a display, and a controller for controlling the output section to set a target azimuth corresponding to an azimuth at an image capture and to adjust a photographing direction to the target azimuth when one of the plurality of the image data is captured. Thus, after photographing the subject in various angles while precisely controlling the photographing direction, the panoramic image can be created by combining the captured images.

15 Claims, 9 Drawing Sheets

1st Image @ 30°  2nd Image @ 45°

1st Image @ 30°

2nd Image @ 45°

PHOTOGRAPHING DEVICE AND METHOD FOR PANORAMIC IMAGING

CROSS-REFERENCE TO RELATED APPLICATIONS

This application claims priority from Korean Patent Application No. 2004-65917 filed on Aug. 20, 2004 in the Korean Intellectual Property Office, the entire disclosure of which is incorporated herein by reference.

BACKGROUND OF THE INVENTION

1. Field of the Invention

Apparatuses and methods consistent with the present invention relate to panoramic imaging, and more particularly, to a photographing device and method for capturing an image fit to form a panoramic image by detecting a change of an azimuth by use of a geomagnetic sensor.

2. Description of the Related Art

With growth of communication technology, various wireless mobile communication devices such as mobile phones, notebooks, and personal digital assistants (PDAs) have been developed and released into the market. Especially for mobile phones, which have the highest penetration rate, diverse functions such as a photographing function and a video recording function are additionally provided as compared with the functions of initial models. However, because the photographing function of the mobile phone is only a more recently added function, its resolution and performance are inferior to that of dedicated photographing devices such as digital cameras or digital camcorders. For example, the mobile phones without a zoom function have a limited focusing range. Thus, even when a user wants to take a picture of scenic images such as mountains, seas, and valleys, it is hard to capture the whole view.

To address the above disadvantages, a method disclosed in Korean Patent No. 2001-42265 captures a plurality of images and combines the captured image to make a panoramic image. In the above Korean Patent, the plurality of images is captured by measuring a relative azimuth and position by use of an acceleration sensor and a gyro sensor. However, the acceleration sensor requires relatively large power consumption and is vulnerable to shocks. The gyro sensor is also vulnerable to shocks and is high-priced. In addition, it is not easy to miniaturize these sensors to be built in small-sized electronic devices such as mobile phones.

As for the usage of the gyro sensor, acceleration is measured and integrated to obtain the velocity. Next, a double integration is applied to acquire displacement information of a camera. In this case, an integral constant generated during the integration may cause error. Even if the user stops the rotation over a certain angle, the continuous rotation may be recognized due to the integral constant. To combine a plurality of images to a panoramic image, accurate control of the photographing angle is demanded. As a result, in the related art, it is difficult to attain the panoramic image.

SUMMARY OF THE INVENTION

The present invention has been provided to solve the above-mentioned and other problems and disadvantages occurring in the conventional arrangement, and an aspect of the present invention provides a photographing device and method for accurately controlling a photographing direction for images by measuring an azimuth using a geomagnetic sensor when capturing a plurality of images to create a panoramic image.

To achieve the above aspect of the present invention, a photographing device includes an image capture section for photographing a subject and outputting image data representing the subject, a sensor module for computing and outputting an azimuth of a photographing direction toward the subject, an image processor for creating a panoramic image by combining a plurality of image data captured at the image capture section, an output section for displaying a message using a display and/or sound, and a controller for controlling the output section to set a target azimuth corresponding to an azimuth at an image capture and to adjust a photographing direction to the target azimuth when one of the plurality of the image data is captured.

The controller may control the output section to display a message indicating to capture an image for outputting next image data when a change of the azimuth according to the adjustment of the photographing direction is checked and the azimuth of the photographing direction matches the target azimuth.

The photographing device may further include a key signal input section for inputting an image capture command with respect to the subject, a main memory for storing image data captured in a photographing direction according to the image capture command and storing azimuth information of the photographing direction, and an on-screen display (OSD) generator for generating an OSD that displays the message.

The sensor module may include a geomagnetic sensor for outputting an electric signal having an intensity corresponding to the geomagnetism, and a sensor module controller for computing the azimuth of the photographing direction using an output value from the geomagnetic sensor.

The geomagnetic sensor may include a geomagnetism detector for including an X-axis fluxgate and a Y-axis fluxgate that are mutually orthogonal, and the geomagnetism detector that detects electric signals corresponding the geomagnetism from the X-axis and Y-axis fluxgates, respectively, and a signal processor for converting the electric signals detected from X-axis and Y-axis fluxgates to X-axis and Y-axis output values, respectively, and outputting the converted output values.

The sensor module controller may normalize the X-axis and Y-axis output values to values within a certain range, substitute the normalized X-axis and Y-axis output values according to a particular equational relationship, and compute the azimuth.

The sensor module further may include a tilt sensor for detecting a tilt of the photographing device.

The controller may set and store a tilt at a first image capture as a reference tilt when the first image capture with respect to the subject is completed, check a change of the tilt according to the adjustment of the photographing direction, and control the output section to display a message indicating to capture an image for outputting next image data when the tilt matches the reference tilt.

The controller may compute a target tilt corresponding to the tilt of an image capture when one of the plurality of the image data is captured and output, and control the output section to display a message indicating to adjust the photographing direction so that the tilt matches the target tilt.

In accordance with another aspect of the present invention, a photographing method for creating a panoramic image using a plurality of image data includes generating and storing one of the plurality of image data obtained by photographing a subject, computing an azimuth of a photographing direction for the subject and storing the azimuth as a reference azimuth, setting a target azimuth corresponding to the reference azimuth, displaying a message indicating to adjust the photographing direction to the target azimuth, and checking a change of the azimuth according to the adjustment of the photographing direction and displaying a message indicating to capture an image for outputting next image data when the checked azimuth matches the target azimuth.

The photographing method may further include creating the panoramic image by combining whole image data when the whole image data forming the panoramic image are acquired.

The photographing method may further include computing a tilt of the photographing direction for the subject and storing the tilt as a reference tilt, and checking a change of the tilt according to the adjustment of the photographing direction and displaying a message indicating to capture an image for outputting next image data when the tilt matches the reference tilt.

The photographing method may further include computing the tilt of the photographing direction for the subject and storing the tilt as the reference tilt, setting a target tilt corresponding to the reference tilt, displaying a message indicating to adjust the photographing direction so that the tilt matches the target tilt, and checking the change of the tilt according to the adjustment of the photographing direction and displaying a message indicating a second image capture when the checked tilt matches the target tilt.

The computing and storing of the azimuth may include detecting electric signals corresponding to geomagnetism using X-axis and Y-axis fluxgates that are mutually orthogonal, respectively, converting the electric signals which are detected from the X-axis and Y-axis fluxgates to X-axis and Y-axis output values, normalizing the X-axis and Y-axis output values to values within a certain range, and computing the azimuth by substituting the normalized X-axis and Y-axis output values into a specific equation.

BRIEF DESCRIPTION OF THE DRAWING FIGURES

These and other aspects of the invention will become apparent and more readily appreciated from the following description of exemplary embodiments, taken in conjunction with the accompanying drawing figures of which.

DETAILED DESCRIPTION OF EXEMPLARY EMBODIMENTS OF THE INVENTION

Exemplary embodiments of the present invention will now be described in greater detail with reference to the accompanying drawings.

In the following description, same drawing reference numerals are used for the same elements even in different drawings. The matters defined in the description, such as detailed construction and element descriptions, are provided to assist in a comprehensive understanding of the invention. Also, well-known functions or constructions are not described in detail since they would obscure the invention in unnecessary detail.

Figure 1:
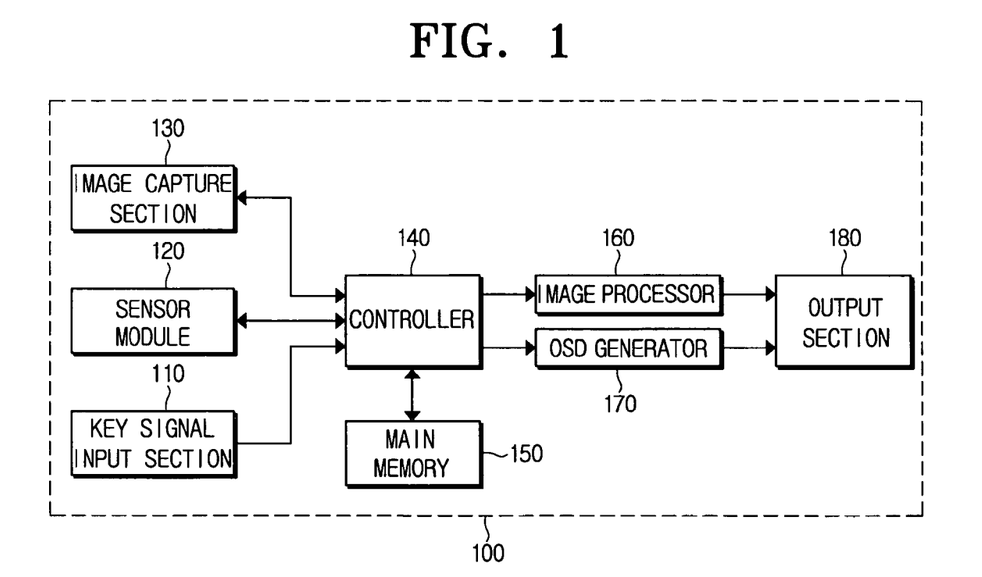
FIG. 1 is a block diagram of a photographing device according to an exemplary embodiment of the present invention.

FIG. 1 is a block diagram of a photographing device 100 according to an exemplary embodiment of the present invention. In FIG. 1, the photographing device 100 includes a key signal input section 110, a sensor module 120, an image capture section 130, a controller 140, a main memory 150, an image processor 160, an on-screen display (OSD) generator 170, and an output section 180.

The key signal input section 110 recognizes a selection signal input by a user using a button provided on a body of the photographing device 100 or a remote controller, and notifies the controller 140 of the input selection signal. The user can input a capture mode selection command, an image capture command, and the like through the key signal input section 110. The capture mode of the photographing device 100 may includes a normal mode, a panorama mode, and the like.

The sensor module 120 detects an azimuth corresponding to geomagnetism. The azimuth is an angle measured clockwise from a true north to a direction of a lens, that is, the photographing direction of the photographing device 100. The true north for the azimuth may be a magnetic north. In this case, let the clockwise rotation from the magnetic north be a (+) direction, and the counterclockwise rotation be a (−) direction. The sensor module 120 includes a geomagnetic sensor to measure the azimuth. According to another exemplary embodiment of the present invention, the sensor module 120 may further include a tilt sensor to compute the tilt of the photographing device 100. Construction and operation of the sensor module 120 will be provided in more detail.

The image capture section 130 photographs a subject and creates an image of the subject. To do this, the image capture section 130 includes a lens (not shown) to converge an optical signal reflected against the subject, and a charge-coupled device (CCD) (not shown) to convert the converged optical signal to an electric signal.

When the user inputs the image capture command through the key signal input section 110 in the normal mode, the controller 140 controls the image capture section 130 to take a picture and to display the captured image on a display screen via the output section 180. Next, when an image storage command is input, the captured image data is stored in the main memory 150.

When the user inputs the image capture command in the panorama mode, the controller 140 controls to photograph the subject, similarly to the normal mode, and controls the sensor module 120 to detect the azimuth of the current photographing direction. The first image data captured and the detected azimuth information are recorded in the main memory 150.

Next, the controller 140 sets the detected azimuth to a reference azimuth and computes a target azimuth correspondingly. Specifically, an appropriate degree by which the photographing direction is rotated which is fit for the panorama imaging is computed as the target azimuth.

The controller 140 periodically checks the current azimuth of the photographing device 100 and guides the user to rotate the photographing device 100 up to the target azimuth. To this end, the controller 140 controls the OSD generator 170 and the output section 180 to display the reference azimuth, the target azimuth, and the current azimuth on the screen. Accordingly, the user perceives the current azimuth and rotates the photographing device 100 toward the direction of the target azimuth. When the current azimuth reaches the target azimuth, the controller 140 controls the OSD generator 170 and the output section 180 to display on the screen a message indicating that a second image can be captured.

Next, when the user inputs the image capture command, the controller 140 controls the image capture section 130 to capture the second image. The second image data captured is stored in the main memory 150.

The image processor 160 combines the first image data and the second image data using a stitching program, and creates one panoramic image. The created panoramic image is output on the screen via the output section 180, or transmitted to an external terminal connected through an interface (not shown).

The panoramic image may consist of more than two images. In this case, the controller 140, when the panorama mode is selected, controls the OSD generator 170 to produce a certain interface window allowing the user to select the number of images for the panoramic image. The produced interface window is displayed on the screen via the output section 180. Hence, the user can select a desired number of images using the key signal input section 110. When the number of the images is selected, the controller 140 maintains a standby mode for the first image capture. When the second image capture is finished while the number of image specified by the user exceeds two, the azimuth at the second image capture (hereinafter, referred to as a second azimuth) and the second image data are stored in the main memory 150. In this state, the second azimuth is set to the reference azimuth, the target azimuth is redefined accordingly, and the OSD generator 170 and the output section 180 are controlled to guide the user to rotate the photographing device 100 to the direction suitable for a third image capture. When the image capture of the final image is completed, the image processor 160 combines the captured images and creates one panoramic image.

Figure 2:
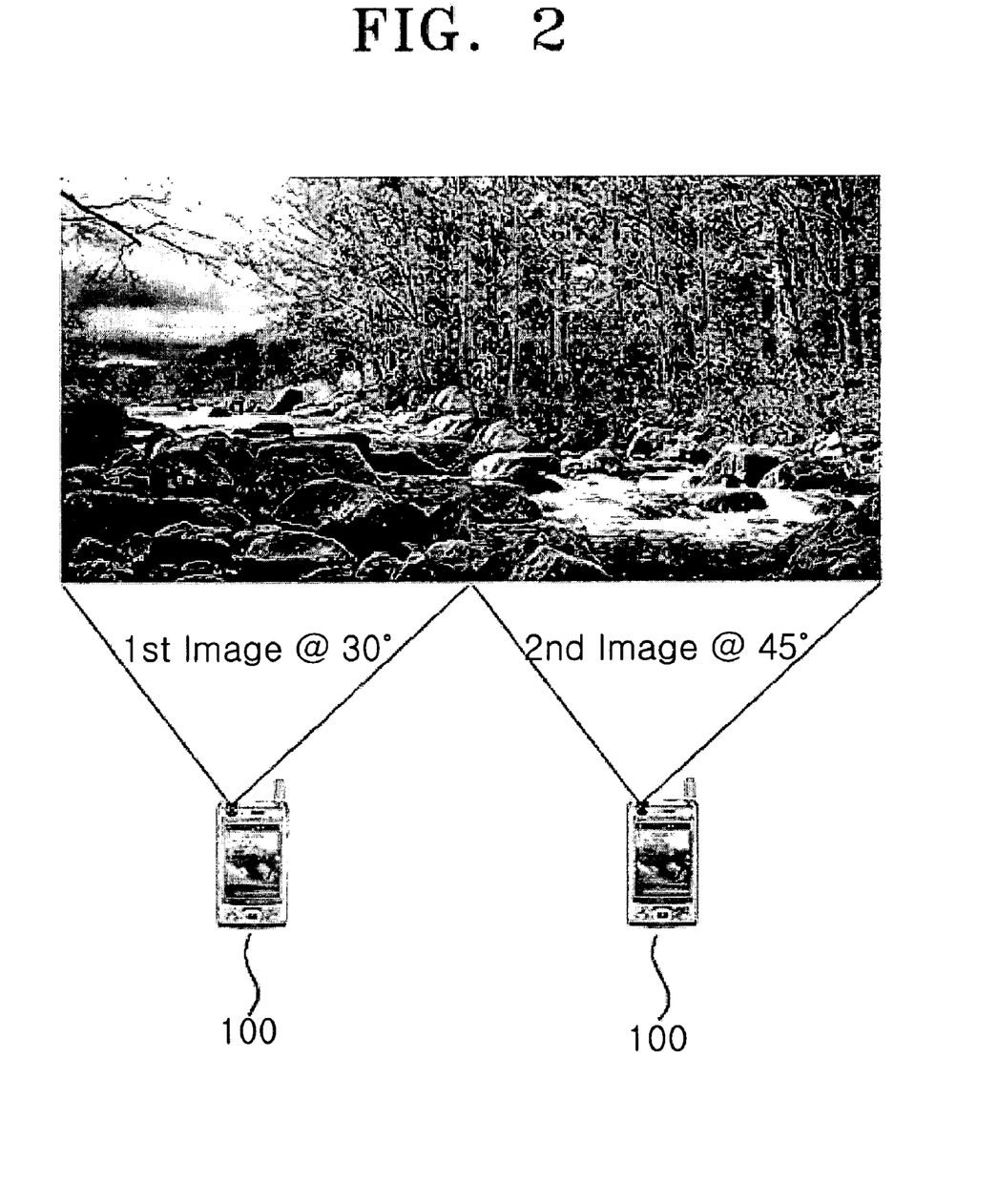
FIG. 2 illustrates a panoramic photography using the photographing device of FIG. 1.
Figure 3:
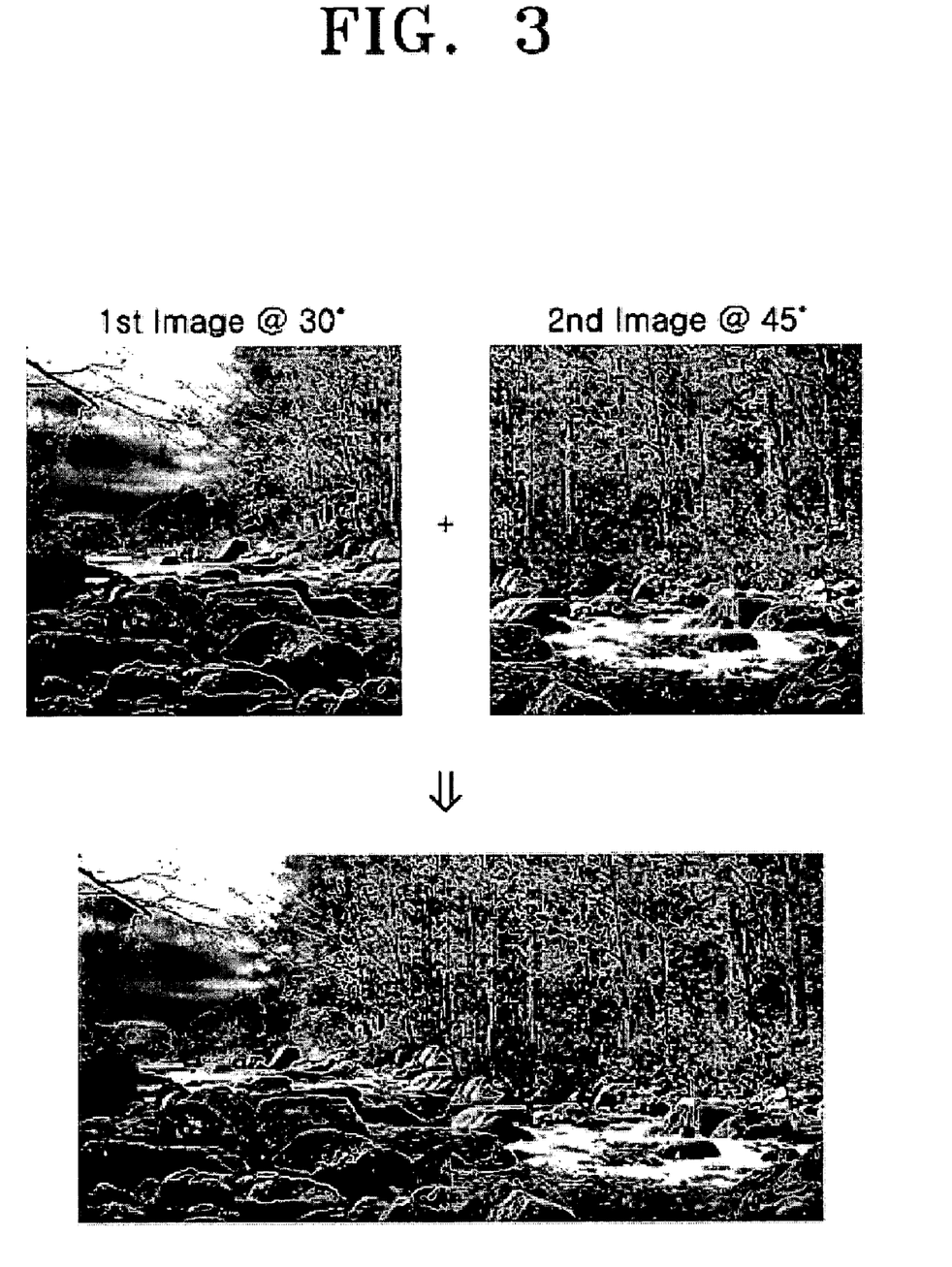
FIG. 3 is a conceptual diagram of panoramic imaging by stitching a plurality of captured images.

FIG. 2 and FIG. 3 are conceptual diagrams illustrating how to prepare the panoramic image using the photographing device 100 of FIG. 1. Referring to FIG. 2, a first image is captured at a point with 30° in a current azimuth, the photographing device 100 is rotated up to 45° in azimuth, and a second image is captured.

Next, one panoramic image is created by combining first image data obtained from the first image capture and second image data obtained from the second image capture as shown in FIG. 3.

Figure 4A:
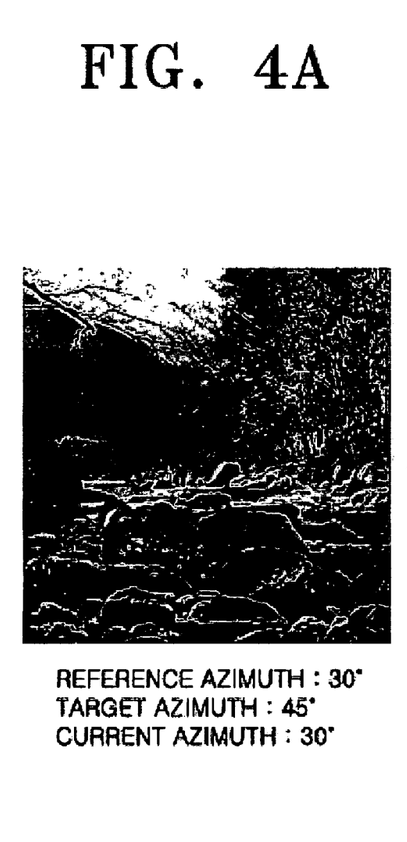
FIGS. 4A-4C are conceptual diagrams of messages displayed on a screen during the panoramic photography using the photographing device of FIG. 1.
Figure 4B:
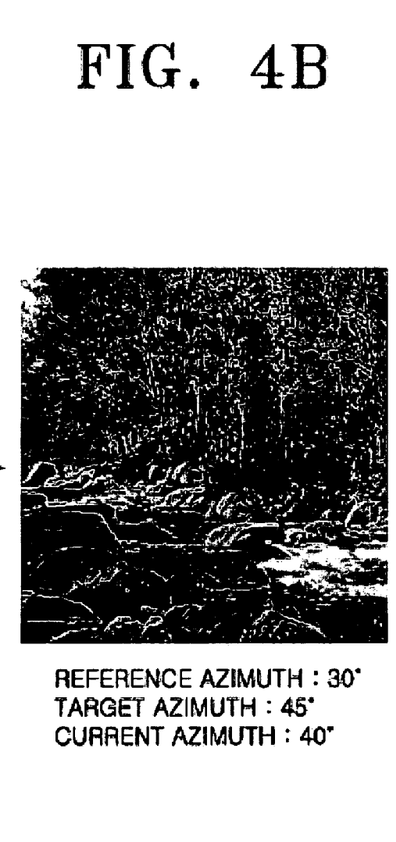
Figure 4C:
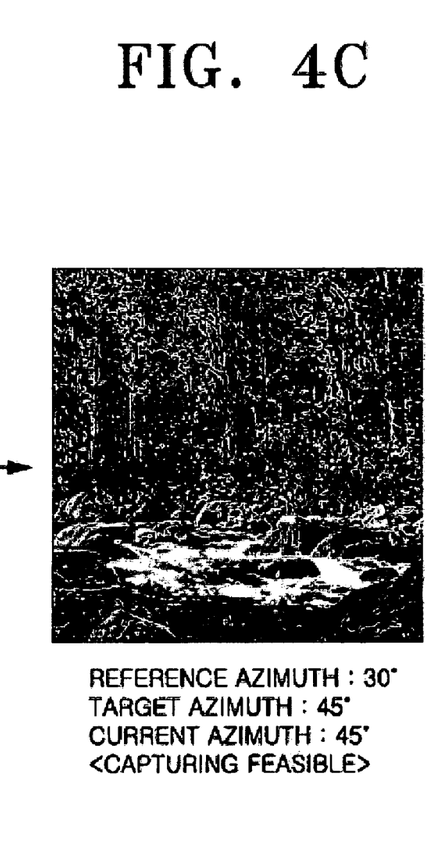

FIGS. 4A-4C are conceptual diagrams showing messages displayed on the screen of the photographing device 100 during the panoramic imaging. When a first image is captured at a point within the current azimuth as shown in FIG. 4A, the reference azimuth 30°, the target azimuth 45°, and the current azimuth 30° are displayed on the screen. Since the clockwise direction based on the magnetic north is defined as the (+) direction, an additional message may be displayed to indicate to rotate the photographing device 100 to the right.

Accordingly, when the user rotates the photographing device 100 to the right by a certain angle, the change of the current azimuth is periodically displayed as shown in FIG. 4B, so that the user can determine whether to rotate further in that direction.

Consequently, when the photographing device 100 is rotated to the right by 15° and the current azimuth matches the target azimuth with 45° as shown in FIG. 4C, a message indicating the second image capture is displayed to guide the user to input the image capture command.

In case that the photographing device 100 is tilted during the rotation, only an overlaying portion of the same subject may be combined to create the panoramic image. Alternatively, an additional tilt sensor may adopted to rotate the photographing device 100 with the tilt maintained.

Figure 5:
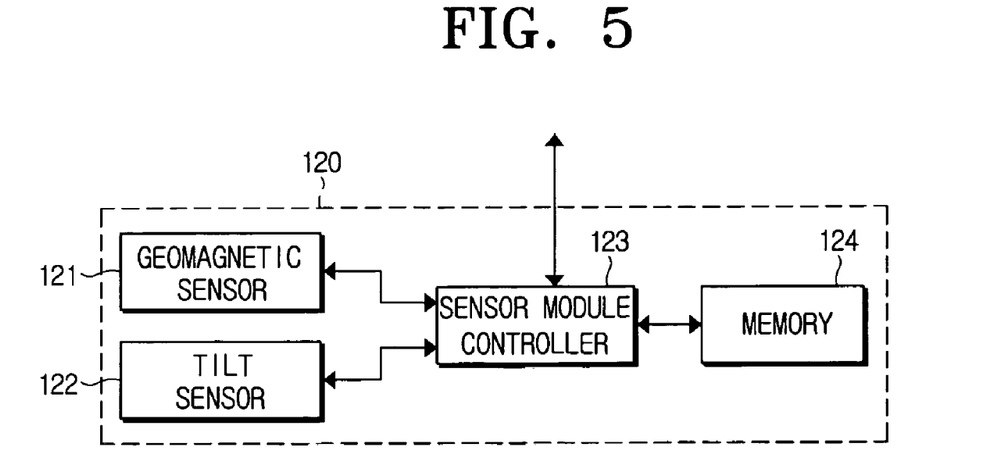
FIG. 5 is a block diagram of a sensor module adopted in a photographing device according to another exemplary embodiment of the present invention.

FIG. 5 is a block diagram of the sensor module 120 employed for the photographing device 100 according to an exemplary embodiment of the present invention. In FIG. 5, the sensor module 120 includes a geomagnetic sensor 121, a tilt sensor 122, a sensor module controller 123, and a memory 124.

The geomagnetic sensor 121 outputs an electric signal corresponding to the geomagnetism. To do this, the geomagnetic sensor 121 may be a fluxgate geomagnetic sensor that measures the rotation degree using a 2-axis fluxgate.

The sensor module controller 123 computes the azimuth using the output value of the geomagnetic sensor 121.

The tilt sensor 122 measures a vertical tilt angle. The tilt is an angle between a plane where the photographing device 100 lies and the ground surface, that is, the tilt can be defined as a pitch angle. Provided that the photographing device 100 lies on the plane parallel to the ground surface, the current tilt angle is zero. When the photographing device 100 is rotated to lift the lens direction upward, that is, to lift upwards the photographing direction of the photographing device 100, the tilt is changed. The upward tilt can be defined as (+) sign, and the downward tilt can be defined as (−) sign.

The tilt sensor 122 for measuring the pitch angle can be realized using an acceleration sensor. In this case, a 1-axis acceleration sensor may be utilized solely to measure the pitch angle, but it is preferable to compute a roll angle, in addition to the pitch angle, to obtain the accurate azimuth. Thus, the tilt sensor 122 can be realized using X-axis and Y-axis acceleration sensors that are mutually orthogonal. The sensor module controller 123 normalizes to map to a value within a certain range by substituting the output value from each acceleration sensor into Equation 1.

$$Xt_{norm} = \frac{Xt - Xt_{bias}}{Xt_{sf}}, \quad Xt_{bias} = \frac{(Xt_{max} + Xt_{min})}{2}, \quad \text{[Equation 1]}$$

$$Xt_{sf} = \frac{(Xt_{max} - Xt_{min})}{2} \quad Yt_{norm} = \frac{Yt - Yt_{bias}}{Yt_{sf}},$$

$$Yt_{bias} = \frac{(Yt_{max} + Yt_{min})}{2}, \quad Yt_{sf} = \frac{(Yt_{max} - Yt_{min})}{2}$$

$$\theta = \sin^{-1}(Xt_{norm}) \quad \text{[Equation 2]}$$

$$\phi = \sin^{-1}\left(\frac{Yt_{norm}}{\cos\theta}\right)$$

In Equation 1, Xt is the output value from the X-axis acceleration sensor, Yt is the output value from the Y-axis acceleration sensor, $Xt_{norm}$ is a normalized output value of the X-axis acceleration sensor, $Yt_{norm}$ is a normalized output value of the Y-axis acceleration sensor, $Xt_{max}$ and $Xt_{min}$ are a maximum value and a minimum value of Xt, respectively, and $Yt_{max}$ and $Yt_{min}$ are a maximum value and a minimum value of Yt. $Xt_{bias}$ and $Xt_{sf}$ are a bias value and a scale factor of the X-axis acceleration sensor, respectively. $Yt_{bias}$ and $Yt_{sf}$ are a bias value and a scale factor of the Y-axis acceleration sensor, respectively. In Equation 2, $\theta$ is the pitch angle, and $\phi$ is the roll angle.

Figure 6:
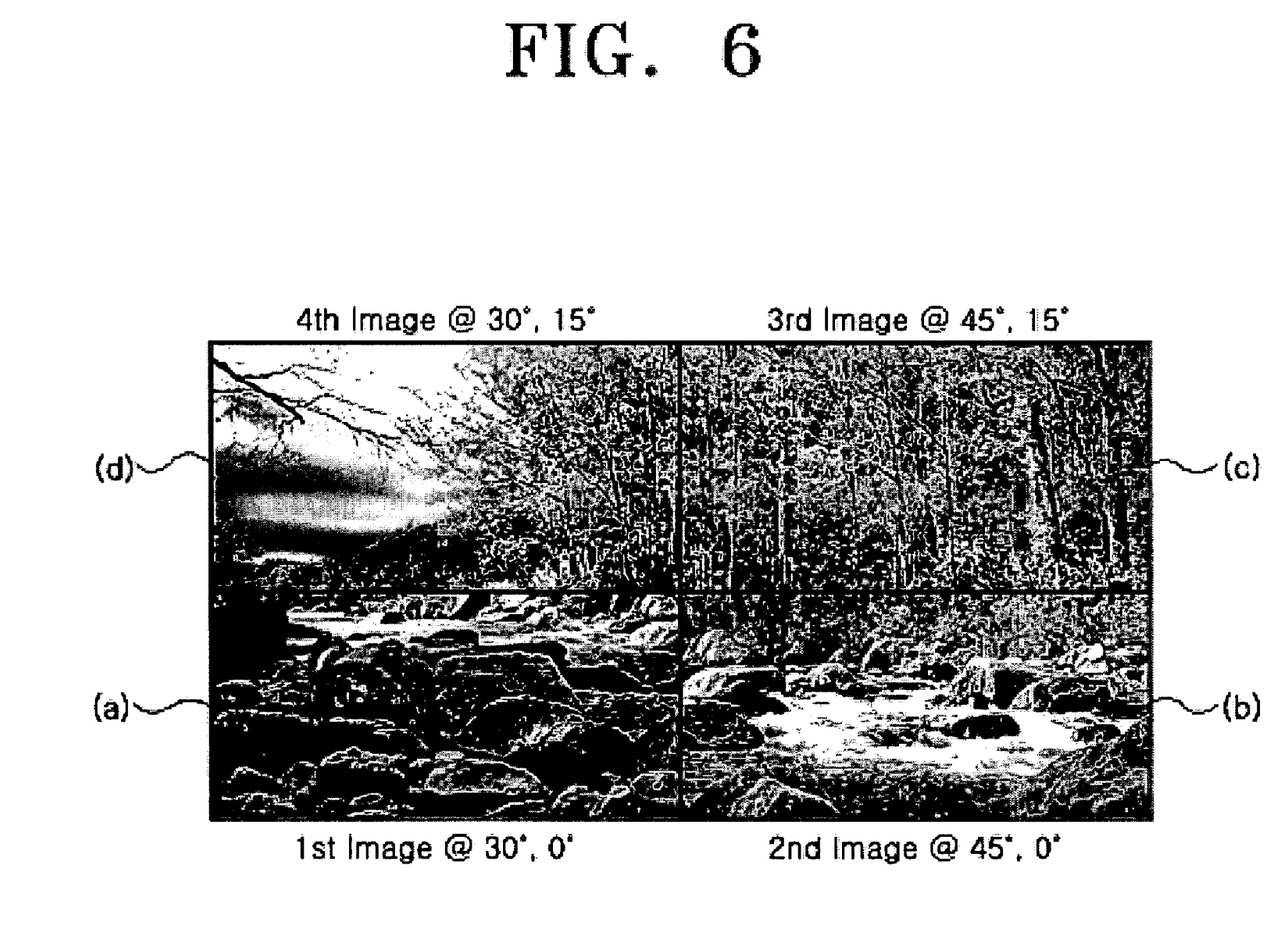
FIG. 6 is a conceptual diagram of an exemplary panoramic image created using the photographing device of FIG. 5.

FIG. 6 is a conceptual diagram of a panoramic image with 2×2 size captured using the sensor module 120 of FIG. 5. Referring to FIG. 6, an azimuth of a first image capture is 30° and the tilt is horizontal, that is, 0°. The first image capture obtains first image data (a). A second image capture obtains second image data (b) by rotating clockwise with 15° on the horizon. Next, the lens direction of the photographing device 100 is lifted up perpendicularly to the ground surface to increase the tilt by 15°, and a third image capture obtains third image data (c). Fourth image data (d) is obtained by rotating the photographing device 100 counterclockwise with the tilt 15° maintained. Upon completing the fourth image capture, the controller 140 controls the image processor 160 to combine the captured images and create the panoramic image as shown in FIG. 6.

To guide the user to adjust the tilt, after the first image capture, the controller 140 sets the tilt at the first image capture to the reference tilt, and computes the corresponding target tilt. Next, every time the user adjusts the tilt, the current tilt is computed and displayed on the screen as the OSD. When the current tilt reaches the target tilt, a message is displayed indicating that the image capture is feasible.

Figure 7:
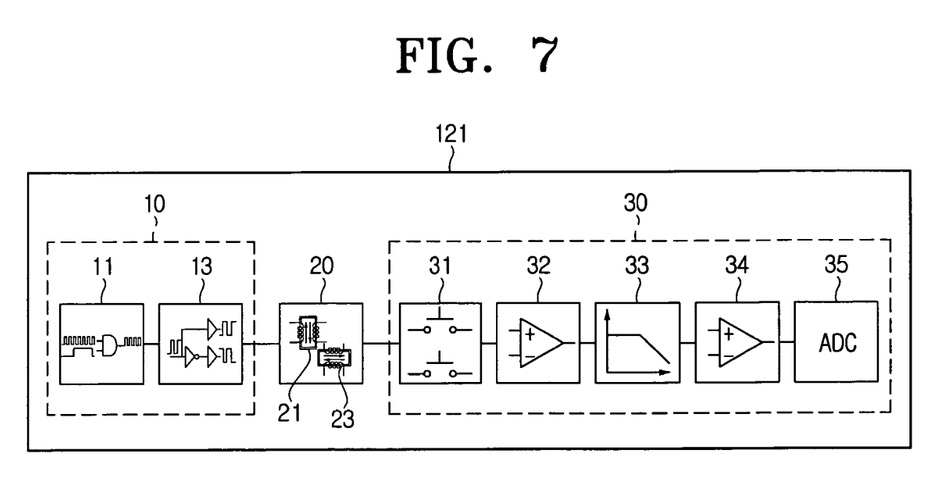
FIG. 7 is a block diagram of a geomagnetic sensor of the photographing device according to an exemplary embodiment of the present invention.

FIG. 7 is a block diagram of the geomagnetic sensor 121 employed in the sensor module 120 of FIG. 5. In FIG. 7, the geomagnetic sensor 121 includes a driving signal generator 10, a geomagnetism detector 20, and a signal processor 30.

The driving signal generator 10 is responsible for generating a driving signal for the geomagnetism detector 20. The driving signal generally employs a pulse waveform and a reverse pulse waveform. Specifically, the driving signal generator 10 includes a pulse restrictor 11 and a pulse amplifier 13. The pulse restrictor 11 selectively switches a pulse signal with a certain size according to a control signal, and the pulse amplifier 13 amplifies and inverting-amplifies the signal to be output. An AND gate can be utilized as the pulse restrictor 11. The pulse amplifier 13 employs a plurality of amplifiers and inverting amplifiers to apply two pulse signals having opposite phases with respect to the pulse output from the pulse restrictor 11, to the geomagnetism detector 20.

Upon receiving the driving signal from the driving signal generator 10, the geomagnetism detector 20 outputs an electric signal corresponding to the geomagnetism. Referring to FIG. 7, X-axis and Y-axis fluxgates 21 and 23 are constructed by winding a driving coil and a sensing coil around two magnetic cores that are rectangular rings disposed along X and Y axes, respectively. When the driving pulse is applied to the driving coils, the magnetism is generated at the X-axis and Y-axis fluxgates 21 and 23, and the consequently induced electromotive force is detected at the sensing coil.

The signal processor 30 processes and converts the induced electromotive force, which is detected from the X-axis and Y-axis fluxgates 21 and 23, to a digital value, and outputs the digital value. In detail, the signal processor 30 includes a chopping circuitry 31, a first amplifier 32, a filter 33, a second amplifier 34, and an analog-to-digital (A/D) converter 35. The electric signal, which is output from the geomagnetism detector 20 and induced at the X-axis and Y-axis fluxgates, is chopped by controlling a plurality of switches in the chopping circuitry 31. The chopped electric signal is differentially amplified at the first amplifier 32, filtered to a signal within a certain range at the filter 33, and finally amplified at the second amplifier 34. The amplified signal is converted to a digital voltage value at the A/D converter 35.

The sensor module controller 123 normalizes to map the output value from the signal processor 30 into a certain range. To do this, a manufacturer of the sensor module 120 measures the output value at the X-axis and Y-axis fluxgates 21 and 23 in advance while rotating the sensor module 120 at least one time on the horizontal plane. Upon measuring the output values, the maximum value and the minimum value of the measured output values are selected and recorded in the memory 124.

The sensor module controller 123 normalizes by substituting the maximum value and the minimum value recorded in the memory 124, and the output values at the X-axis and the Y-axis detected at the signal processor 30, into the following equation.

$$X_n = \frac{(X - X_{bias})}{X_{scale}}, X_{bias} = \frac{(X_{max} + X_{min})}{2},$$

$$X_{scale} = \frac{(X_{max} - X_{min})}{2}$$

$$Y_n = \frac{(Y - Y_{bias})}{Y_{scale}},$$

$$Y_{bias} = \frac{(Y_{max} + Y_{min})}{2}, Y_{scale} = \frac{(Y_{max} - Y_{min})}{2}$$

[Equation 3]

In Equation 3, X and Y are output values of the X-axis and Y-axis fluxgates 21 and 23, respectively. $X_n$ and $Y_n$ are normalized values of X and Y. $X_{max}$ and $X_{min}$ are the maximum value and the minimum value of X respectively, and $Y_{max}$ and $Y_{min}$ are the maximum value and the minimum value of Y respectively. The sensor module controller 123 substitutes $X_{max}$, $X_{min}$, $Y_{max}$, and $Y_{min}$, which are measured in advance and recorded in the memory 124, into Equation 3, obtains $X_{bias}$, $X_{scale}$, $Y_{bias}$, and $Y_{scale}$, and calculates $X_n$ and $Y_n$ using the obtained $X_{bias}$, $X_{scale}$, $Y_{bias}$, and $Y_{scale}$.

Figure 8:
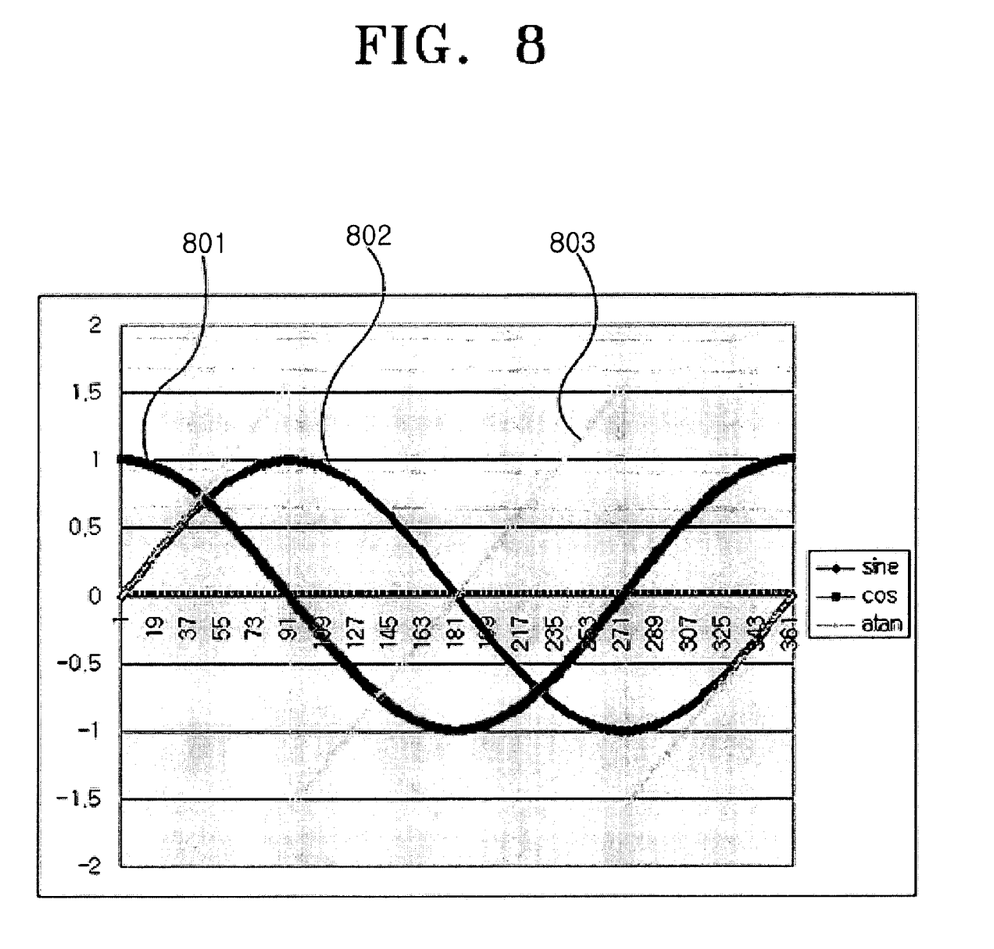
FIG. 8 is a graph showing output values of the geomagnetic sensor according to an exemplary embodiment of the present invention.

FIG. 8 is a graph showing the output values at X-axis and Y-axis normalized at the sensor module controller 123. In FIG. 8, the X-axis output value is presented as the cos function 801, and the Y-axis output value is presented as the sine function 802.

The sensor module controller 123 computes the azimuth using the X-axis and Y-axis output values. In other words, the azimuth $\Psi$ is expressed as $\tan^{-1}$ (Y-axis output value/X-axis output value). FIG. 8 shows the graph of the tan function 803 expressed as Y-axis output value/X-axis output value.

The $\tan^{-1}$ function value ranges from 0° to 90° in quadrant 1, from −90° to +90° in quadrants 2 and 3, and from −90° to 0° in quadrant 4. To represent the whole range from 0° to 360°, the sensor module controller 123 computes the azimuth from Equation 4.

Quadrant 1: azimuth=$\tan^{-1}(Y/X)$

Quadrant 2 and quadrant 3: azimuth=$180°+\tan^{-1}(Y/X)$

Quadrant 4: azimuth=$360°+\tan^{-1}(Y/X)$ [Equation 4]

In Equation 4, X and Y are the X-axis output value and the Y-axis output value respectively.

Alternatively, the sensor module controller 123 may compute the more accurate azimuth with the tilt effect compensated by use of the pitch angle and the roll angle measured at the tilt sensor 122 based on Equation 5.

$$Z_n = \frac{(X_n * \sin\theta - Y_n * \cos\theta * \sin\phi + \sin\lambda)}{\cos\theta * \cos\phi}$$ [Equation 5]

$$\alpha = \tan^{-1}\left(\frac{Z_n * \sin\phi - Y_n * \cos\phi}{X_n * \cos\theta + Y_n * \sin\theta * \sin\phi + Z_n * \sin\theta * \cos\phi}\right)$$

In Equation 5, Z is a voltage value of a virtual Z-axis. $X_n$, $Y_n$, and $Z_n$ are the normalized output value of the X-, Y- and Z-axis fluxgates, respectively. $\alpha$ is the azimuth, $\lambda$ is a dip, $\theta$ is the pitch angle, and $\phi$ is the roll angle. As the azimuth is a value in a 3-dimensional space with three axes, in order to accurately compute the azimuth, the output value of the Z-axis perpendicular to the X-axis and Y-axis plane is computed and used to obtain the azimuth.

The controller 140 computes the azimuth and the tilt of the photographing direction from Equation 4 or Equation 5, and guides the user to adjust the position of the photographing device 100 toward the optimal direction for the next image capture as explained above.

Figure 9:
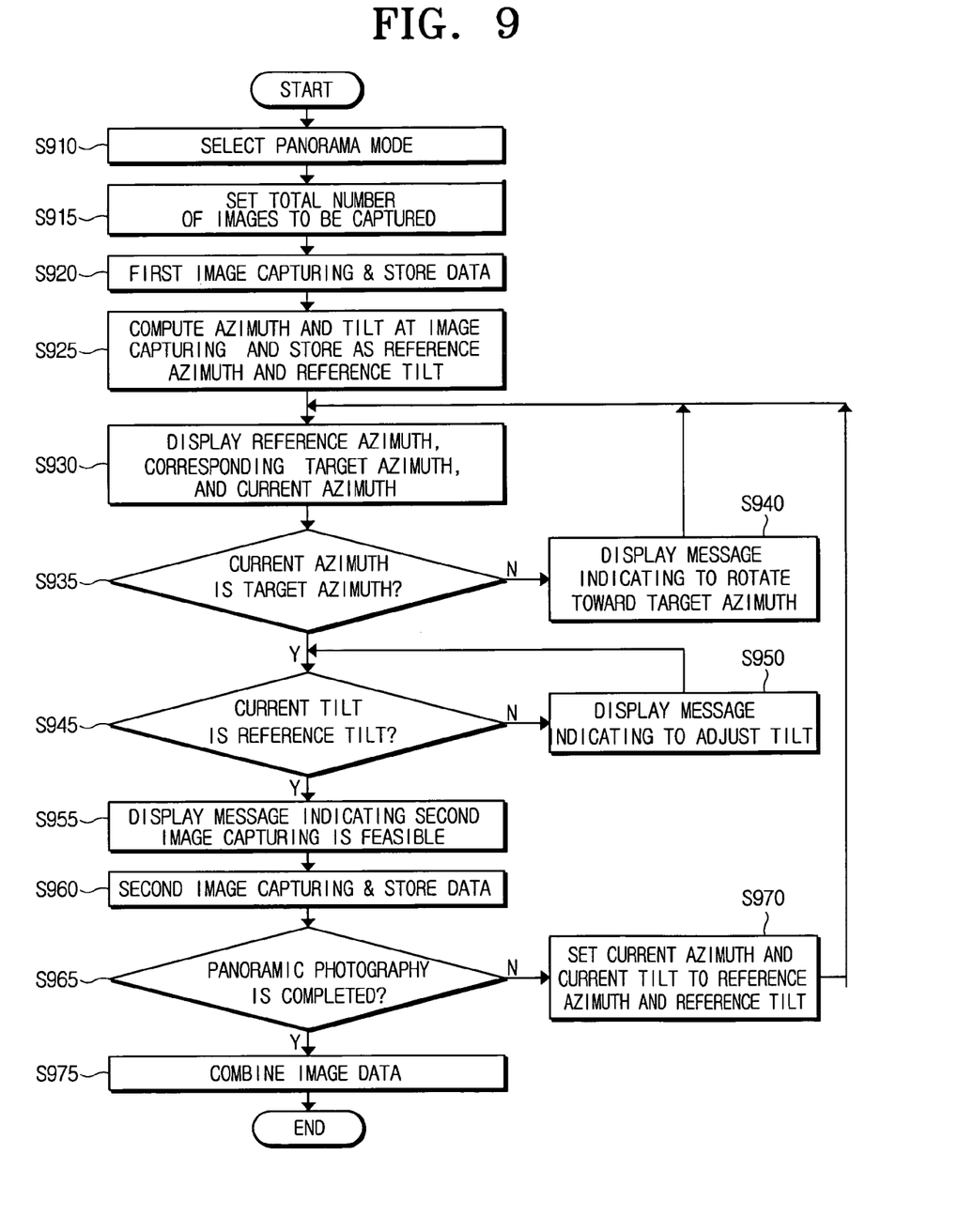
FIG. 9 is a flowchart explaining the panoramic photography according to an exemplary embodiment of the present invention.

FIG. 9 is a flowchart explaining a photographing method according to an exemplary embodiment of the present invention. Referring now to FIG. 9, when the user selects the panorama mode (S910), the OSD interface window is displayed on the screen so that the user can set the total number of images to be captured (S915). Rather than setting the number of images, an option of whether to select the series image capture may be displayed to the user at every image capture.

When the user completes the first image capture, the first image data is stored in the memory 150 (S920). The information relating to the azimuth computed at the sensor module 120 is stored together (S925). Provided that the sensor module 120 is provided with the tilt sensor 122 as illustrated FIG. 5, the tilt of the photographing device 100 at the first image capture can be stored together.

To guide the user to adjust the photographing direction, the controller 140 displays on the screen the reference azimuth, the corresponding target azimuth, and the current azimuth (S930). The reference azimuth can be set to the azimuth at the previous image capture, and the target azimuth can be defined by adding or subtracting a preset angle to or from the reference azimuth. The controller 140 periodically checks the change of the azimuth during the adjustment of the photographing direction by the user and displays the changing azimuth as the current azimuth.

Until the current azimuth reaches the target azimuth (S935), the message indicating to rotate the photographing device 100 is displayed (S940).

If the tilt sensor 122 is given, it is determined whether the current tilt is the reference tilt (S945). Until the current tilt reaches the reference tilt (S945), the message indicating to adjust the tilt is displayed (S950). Accordingly, it is possible to prevent an inconsistent tilt at every image capture. A plurality of images may be taken in the vertical direction by guiding the user to adjust the tilt based on the target tilt.

When the azimuth matches the target azimuth and the tilt matches the reference tilt, a message is displayed to indicate that the second image capture is feasible (S955).

When the user inputs the image capture command and completes the second image capture, the second image data is stored (S960).

When an additional image is required to prepare the panoramic image (S965), the azimuth at the second image capture is reset to the reference azimuth and the target azimuth is re-computed (S970). Next, operations S930 through S960 are repeated.

Finally, the image capture is finished, and one panoramic image is prepared by combining all of the captured images (S975).

As such, even when the photographing angle of the photographing device 100 is limited, one large-scale panoramic image can be prepared.

In light of the foregoing as set forth above, the photographing direction is adjustable using the azimuth measured by the geomagnetic sensor. Hence, a plurality of images can be taken in various directions and combined together to create one panoramic image. The present invention can precisely control the photographing direction since error due to the integral constant generated when the gyro sensor is used can be avoided. Furthermore, the geomagnetic sensor, which can be microminiaturized using the micro electro mechanical systems (MEMS) technology, is suitable for small-sized photographing devices.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A photographing device comprising:
    an image capture section which photographs a subject and outputting image data representing the subject;
    a sensor module which computes and outputs an azimuth of a photographing direction toward the subject;
    an image processor which creates a panoramic image by combining a plurality of image data captured at the image capture section;
    an output section which displays a message using a display or sound; and
    a controller which controls the output section to set a target azimuth corresponding to an azimuth at an image capture and to display the message indicating the azimuth at the image capture, the target azimuth, and a current azimuth according to adjustment of the photographing direction so as to adjust a photographing direction to the target azimuth when one of the plurality of the image data is captured.

2. The photographing device according to claim 1, wherein the controller controls the output section to display a message indicating to capture an image for outputting next image data when a change of the azimuth according to the adjustment of the photographing direction is checked and the azimuth of the photographing direction matches the target azimuth.

3. The photographing device according to claim 2, further comprising:
    a key signal input section which inputs an image capture command with respect to the subject;
    a main memory which stores image data captured in a photographing direction according to the image capture command, and azimuth information of the photographing direction; and
    an on-screen display generator for generating an on-screen display that displays the message.

4. The photographing device according to claim 1, wherein the sensor module comprises:
    a geomagnetic sensor which outputs an electric signal having an intensity corresponding to geomagnetism; and a sensor module controller which computes the azimuth of the photographing direction using an output value from the geomagnetic sensor.

5. The photographing device according to claim 4, wherein the geomagnetic sensor comprises:
   a geomagnetism detector which includes an X-axis fluxgate and a Y-axis fluxgate that are mutually orthogonal, and the geomagnetism detector detects electric signals corresponding to geomagnetism from the X-axis and Y-axis fluxgates respectively; and
   a signal processor which converts the electric signals detected from the X-axis and Y-axis fluxgates to X-axis and Y-axis output values respectively, and outputs the convened output values.

6. The photographing device according to claim 5, wherein the sensor module controller normalizes the X-axis and Y-axis output values to values within a certain range, accords the normalized X-axis and Y-axis output values to the following equations and computes the azimuth:

$$\text{quadrant 1: azimuth} = \tan^{-1}(Y/X)$$

$$\text{quadrant 2 and quadrant 3: azimuth} = 180° + \tan^{-1}(Y/X)$$

$$\text{quadrant 4: azimuth} = 360° + \tan^{-1}(Y/X),$$

wherein quadrant 1 through quadrant 4 are unit quadrants that are divided from a rotation range of the photographing direction by 90° based on a magnetic north, and X and Y are the normalized X-axis and Y-axis output values respectively.

7. The photographing device according to claim 4, wherein the sensor module further comprises:
   a tilt sensor which detects a tilt of the photographing device.

8. The photographing device according to claim 7, wherein the controller sets and stores a tilt at a first image capture as a reference tilt when the first image capture with respect to the subject is completed, checks a change of the tilt according to the adjustment of the photographing direction, and controls the output section to display a message indicating to capture an image for outputting next image data when the tilt of the photographing device matches the reference tilt.

9. The photographing device according to claim 7, wherein the controller computes a target tilt corresponding to a tilt of an image capture when one of the plurality of the image data is captured and output, and controls the output section to display a message indicating to adjust the photographing direction so that the tilt matches the target tilt.

10. A photographing method for creating a panoramic image using a plurality of image data, the method comprising:
    generating and storing one of the plurality of image data obtained by photographing a subject;
    computing an azimuth of a photographing direction for the subject and storing the azimuth as a reference azimuth;
    setting a target azimuth corresponding to the reference azimuth;
    displaying a message indicating an azimuth at image capture of the photographed subject, the target azimuth, and a current azimuth according to the adjustment of the photographing direction so as to adjust the photographing direction to the target azimuth; and
    checking a change of the azimuth according to the adjustment of the photographing direction and displaying a message indicating to capture an image for outputting next image data when the azimuth at the photographing direction matches the target azimuth.

11. The photographing method according to claim 10, further comprising:
    creating the panoramic image by combining whole image data when the whole image data forming the panoramic image are acquired.

12. The photographing method according to claim 10, further comprising:
    computing a tilt of the photographing direction for the subject and storing the tilt as a reference tilt; and
    checking a change of the tilt according to the adjustment of the photographing direction and displaying a message indicating to capture an image for outputting next image data when the tilt matches the reference tilt.

13. The photographing method according to claim 10, further comprising:
    computing the tilt of the photographing direction for the subject and storing the tilt as the reference tilt;
    setting a target tilt corresponding to the reference tilt;
    displaying a message indicating to adjust the photographing direction so that the tilt of the photographing device matches the target tilt; and
    checking the change of the tilt according to the adjustment of the photographing direction and displaying a message indicating a second image capture, when the tilt of the photographing device matches the target tilt.

14. The photographing method according to claim 10, wherein the computing and storing of the azimuth comprises:
    detecting electric signals corresponding to geomagnetism using X-axis and Y-axis fluxgates respectively, by using the X-axis fluxgate and the Y-axis fluxgate which are mutually orthogonal;
    converting the electric signals, which are detected from the X-axis and Y-axis fluxgates, to X-axis and Y-axis output values respectively;
    normalizing the X-axis and Y-axis output values to values within a certain range; and
    computing the azimuth by according the normalized X-axis and Y-axis output values into the following equation:

$$\text{quadrant 1: azimuth} = \tan^{-1}(Y/X)$$

$$\text{quadrant 2 and quadrant 3: azimuth} = 180° + \tan^{-1}(Y/X)$$

$$\text{quadrant 4: azimuth} = 360° + \tan^{-1}(Y/X)$$

wherein quadrant 1 through quadrant 4 are unit quadrants that are divided from a rotation range of the photographing direction by 90° based on a magnetic north, and X and Y are the normalized X-axis and Y-axis output values respectively.

15. The photographing method according to claim 10, wherein the azimuth is computed from electric signals corresponding to geomagnetism, the electric signals detected by X-axis and Y-axis fluxgates which are mutually orthogonal.

* * * * *